Figure 1:
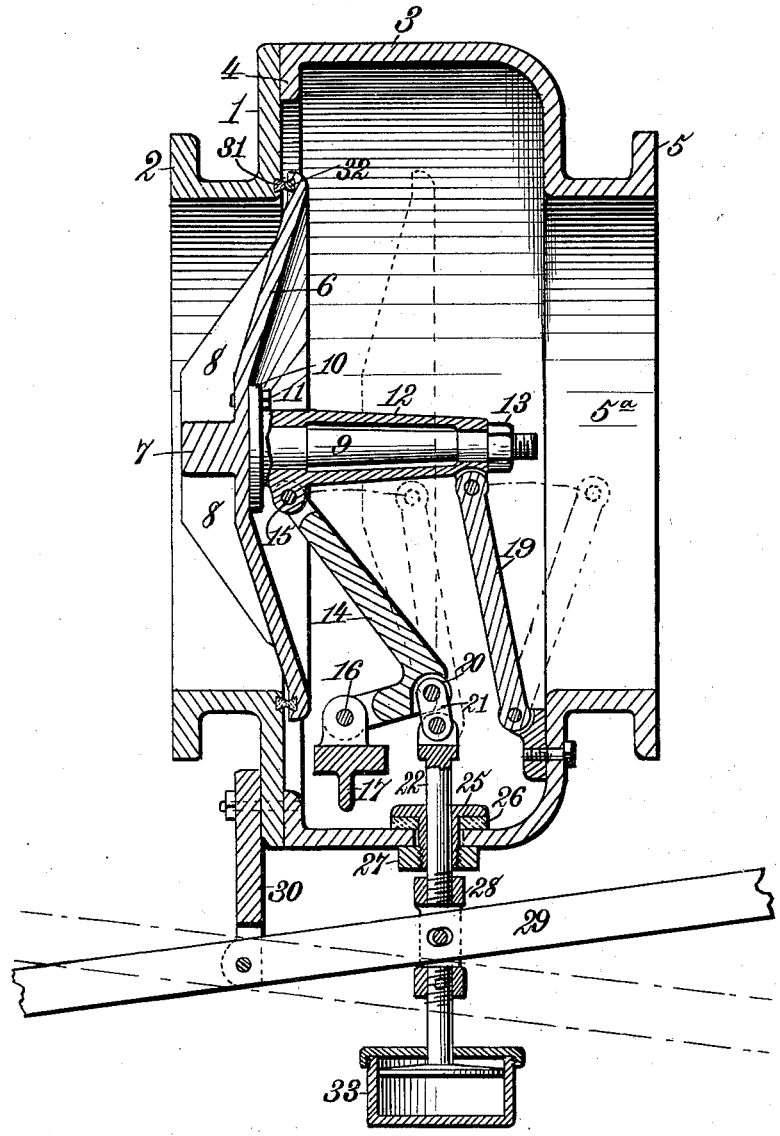

No. 627,049. Patented June 13, 1899.
A. W. CASH.
COMBINED RELIEF AND BACK PRESSURE VALVE.
(Application filed Feb. 18, 1899.)
(No Model.) 2 Sheets—Sheet 1.

Witnesses.
Robert Everett
F. B. Keefer

Inventor:
Arthur W. Cash,
By
James L. Norris
Att'y

No. 627,049. Patented June 13, 1899.
A. W. CASH.
COMBINED RELIEF AND BACK PRESSURE VALVE.
(Application filed Feb. 18, 1899.)
(No Model.) 2 Sheets—Sheet 2.

Witnesses.
Robert Emmett
F. B. Keefe

Inventor:
Arthur W. Cash.
By James L. Norris
Atty.

UNITED STATES PATENT OFFICE.

ARTHUR W. CASH, OF NEWARK, NEW JERSEY, ASSIGNOR TO THE FOSTER ENGINEERING COMPANY, OF SAME PLACE.

COMBINED RELIEF AND BACK-PRESSURE VALVE.

SPECIFICATION forming part of Letters Patent No. 627,049, dated June 13, 1899.

Application filed February 18, 1899. Serial No. 706,011. (No model.)

*To all whom it may concern:*

Be it known that I, ARTHUR W. CASH, a citizen of the United States, residing at Newark, in the county of Essex and State of New Jersey, have invented new and useful Improvements in a Combined Relief and Back-Pressure Valve, of which the following is a specification.

This invention relates to a combined relief and back-pressure valve of the class adapted to be used in connection with large steam-engines of various types in which the steam after having been utilized in the engine and given up its energy passes into what is commonly known as a "condenser," wherein the steam is converted into water. The condition usually prevailing in these condensers is a state of vacuum or partial vacuum produced by reason of the exhaust-steam being cooled and converted into water, thereby greatly reducing its volume, and also by the aid of air or vacuum pumps, which exhaust any remaining pressure left after the condensation. If from failure of the cooling appliances or failure on the part of the vacuum-pumps the condition in the condensers should be changed from a state of vacuum to one of pressure, this pressure would ordinarily accumulate so rapidly that the engine would only make a few strokes or revolutions before the exhaust would equal or so nearly equal the initial pressure as to cause the engine to come to a stop. To prevent such conditions, this valve is intended to be connected to the condenser in such a manner that as long as the pressure in the condenser is below that of atmosphere the valve will remain closed, thereby excluding the atmosphere; but as soon as there is a failure of the cooling appliances or of the vacuum-pump and the pressure in the condenser becomes equal to or greater than atmospheric pressure then the function of this valve is to instantly open and let any excess pressure pass off freely to the atmosphere. If, as is sometimes the case, it is desired that the engine shall exhaust into the condenser or receptacle at some determined pressure above atmospheric, then this valve may be converted into what is commonly known as a "back-pressure" valve by means of suitable weights attached to levers in connection with the valve. These weights having been positioned for some determined pressure, whenever the exhaust exceeds that pressure then the valve will freely open and pass off all such excess, closing again as soon as the pressure reaches its normal or predetermined point. Valves as usually required for these particular services are of such large dimensions as to require their construction of the baser metals, usually iron, in order that their cost may not be excessive. The movable or operative parts being very large and heavy and the base material being very susceptible to corrosion and rapid deterioration under the prevailing conditions of moisture and very low or entire absence of heat, the operative parts after remaining in one position for a considerable time are usually so corroded as to be almost inoperative and will not open freely and quickly, as might be required in an emergency. Again, the valve proper with its seat, together with its corresponding seat in the valve body or casing, if made of iron, as is usually the case, soon deteriorates and becomes so cut or eaten away as to leak badly, and thus destroy the efficiency of the valve.

To avoid or overcome these various difficulties, my invention consists in a combined relief and back-pressure valve comprising the features of construction and novel combinations of parts hereinafter set forth.

Figure 2:
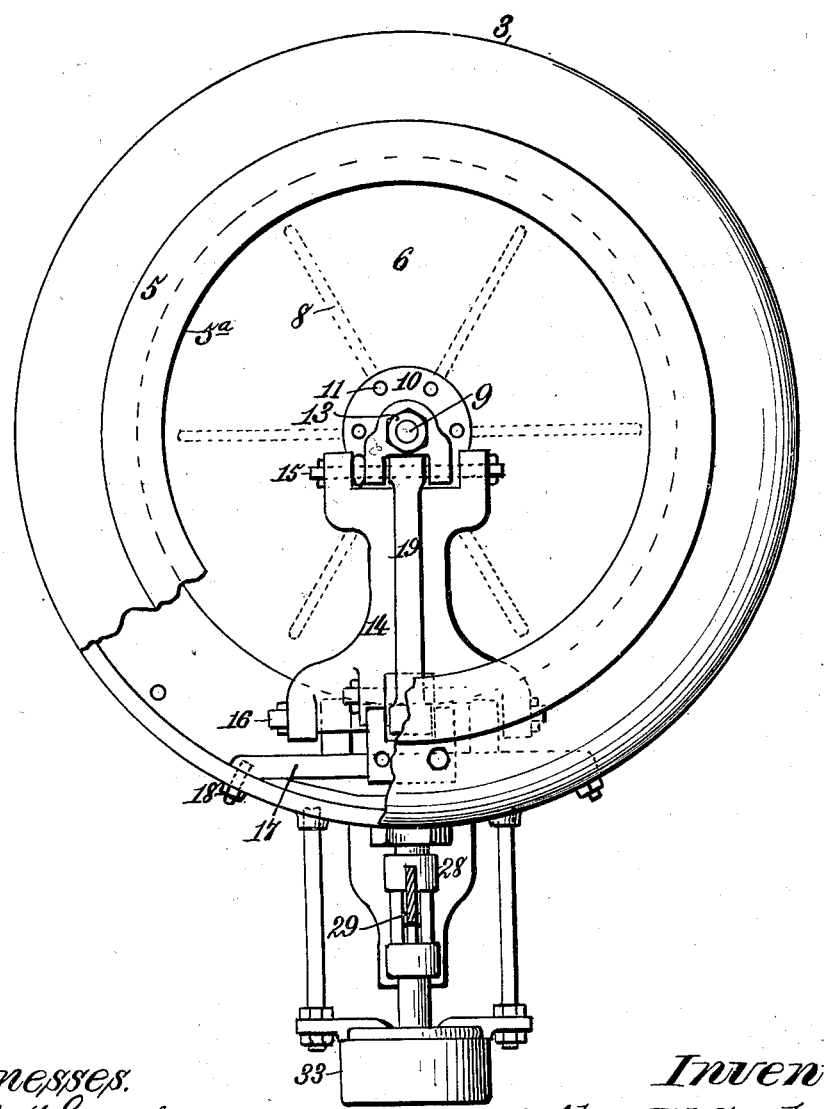

In the annexed drawings, Figure 1 is a vertical central section of my improved valve. Fig. 2 is an elevation of the same from the outlet end, a portion of the casing being broken away to more clearly illustrate a portion of the interior mechanism.

In Fig. 1 the reference-numeral 1 designates an inlet-casing having an annular flange 2, whereby it may be bolted to the condenser or steam-receptacle. The numeral 3 designates the valve casing or body, having an inner annular flange 4, whereby it is bolted to the inlet-casing 1, some suitable thin gasket or packing material being preferably interposed. This valve-casing 3 is also provided with an annular flange 5, surrounding the outlet $5^a$ and to which may be bolted a suitable pipe to conduct the exhaust-steam to some distant point, if so desired. At the inlet to the casing 3 there is arranged a circular dish-shaped valve 6, having a central hub 7 and radial strengthening-webs 8 on one side. To the other side of this dish-shaped valve 6 is attached a spindle or arbor 9 by means of the flange 10 and bolts 11, this spindle being made of some non-corrosive or comparatively non-corrosive metal, such as bronze or steam metal. The spindle 9 passes through a sleeve 12 and is held therein by a nut 13 at one end. The sleeve 12 is supported in a central axial position with relation to inlet-casing 1 and valve-casing 3 by means of a curved lever 14, connecting at its upper end to said sleeve by means of the bronze pin 15 and connected at its lower extremity by a similar pin 16 to a bridge or girder piece 17, which is in turn fastened to the casing 3 by studs or bolts 18, as shown in Fig. 2. To the other or rear end of the sleeve 12 is attached a straight arm 19, which connects at its upper end with said sleeve and at its lower end with the valve-casing 3 by means of pins like those employed in attaching the lever 14. The lever 14 and arm 19 connect through the sleeve 12 and permit said sleeve, together with the valve and valve-spindle, to have a motion parallel with the axis of the valve-casing inlet, whereby the spindle 9 and valve 6 are held at all times in a position axial to or parallel with the axial line of inlet-casing 1 and valve-casing 3.

In the lower side of the elbow or curved portion of the lever 14 there is a recess 20, into which is fitted a link 21, through which the lever 14 is connected to the enlarged bifurcated upper end of a spindle 22 by suitable pins 23 and 24, as shown.

The spindle 22 is fitted closely to and passes freely through the central opening in a gland 25, which has an enlarged flange at its upper end, between which flange and the casing or body 3 is interposed a thick washer or disk 26, of some springy yielding material, such as rubber. A nut 27 is threaded over the lower end of the gland 25 in such manner as to slightly compress the washer 26 to form a fluid-tight joint around the gland 25. This washer 26 also forms a buffer to receive the blow and reduce the shock consequent upon the upper enlarged portion of the spindle 22 coming in contact with and stopping upon the gland 25 whenever the valve 6 is suddenly thrown open to relieve any excessive pressure. To the lower or outer end of the spindle 22 is attached a yoke-piece 28, through which passes a lever 29, that connects with said yoke and is pivoted to a bracket 30, fastened to the casing 1 at one side of the yoke. This lever 29 is for the purpose of connecting suitable weights (not shown) to counterbalance the weight of valve 6, spindle 9, sleeve 12, and lever 14 or to weight these parts against a desired back pressure; also, by means of this lever 29 the valve may be operated manually when so desired. To overcome the evil results consequent to corrosion and eating away of iron valve-seats as generally provided in large valves of this class, I have provided the inlet-casing 1, also the valve 6, with annular seat-rings 31 and 32, respectively, of copper or other suitable non-corrosive metal. The grooves to receive and hold these seat-rings in place are made dovetailed or wider at the bottom part. The seat-rings are placed in said grooves and rolled or crushed until they expand and fill the grooves tightly, when they are machined or faced true, so that the two seats may come in perfect opposing contact at all points around the circle. To further facilitate this perfect contact, the seat-ring 32 on valve 6 is made comparatively narrow and slightly convex on its face in order that it may crush or embed itself into the opposing seat-ring in casing 1. This condition of contact between the seats will more especially occur whenever there is a state of vacuum at the inlet side of the valve or when the lever 29 is weighted to hold the valve 6 with some force against the seat in casing 1.

It will be seen from the construction and arrangement of the lever 14 and arm 19 that when the valve 6 is closed or resting against the seat in casing 1 it will remain of its own weight in this closed position until some force, such as steam-pressure from the inlet side of casing 1 or manual force applied to lever 29, is exerted to throw the valve open. Then it will remain open until the manual force is again applied to close it or in case the lever 29 is weighted to hold the valve closed against a required steam-pressure in the inlet-casing 1. Then when the pressure becomes excessive, so as to open valve 6, it will remain open only so long as the pressure remains excessive or above normal, the weight on lever 29 returning the valve to its seat immediately upon the reduction of pressure.

In the use of relief-valves of this class it may sometimes happen that the vacuum is momentarily lost and restored in comparatively quick succession. In this case the valve may chatter or hammer on its seats with a succession of rapid blows due to the repeated partial opening and closing between the strokes of the engine. Such hammering would not only be annoying, but might become so violent as to injure the seats or break the movable parts of the valve. To avoid this difficulty, I have provided the well-known dash-pot 33, which should be used in connection with the lower end of spindle 22, this dash-pot being filled with oil or some non-corrosive liquid in such manner that spindle 22 would be permitted to move slowly up or down and not rapidly, thus effectually preventing violent and rapid movement of the valve mechanism.

When from continued service the seats 31 and 32 become worn or eaten away, they may be reground by attaching a handle or wrench bar to the threaded end of spindle 9, where it projects through nut 13, and revolving the valve 6 on its bearings in the sleeve 12, some abrasive material, such as fine emery, having been smeared on and between the faces of the seat-rings.

It will be obvious that a combined relief and back-pressure valve of the character described can be applied to advantage in various situations for control of conditions similar to those hereinbefore mentioned.

What I claim as my invention is—

1. The combination with a valve-casing having an inlet and an outlet, and a valve provided with a spindle and arranged to control said inlet, of a lever and an arm connected with the valve-spindle and pivotally supported in the valve-casing to permit the valve and its spindle to move parallel with the axis of the casing-inlet and whereby the said valve and its spindle are maintained at all times in an axial position parallel with the axis of the inlet and valve-casing, substantially as described.

2. The combination with a valve-casing, and a valve provided with a spindle, of a sleeve secured on the valve-spindle, and lever mechanism mounted in the valve-casing and connected with said sleeve whereby said valve and its spindle are maintained at all times in an axial position parallel with the axis of the inlet to the valve-casing, substantially as described.

3. The combination with a valve-casing, and a valve provided with a spindle, of a curved lever mounted in said casing and connected with the valve-spindle at a point adjacent to the valve, an arm mounted in the valve-casing and connected with the valve-spindle near its end, said lever and arm being arranged to permit the valve and its spindle to move parallel with the axis of the casing-inlet, whereby the valve and its spindle are maintained at all times in an axial position with relation to the valve-casing inlet, a spindle extended through the valve-casing and having a link connection with the elbow portion of the curved lever in said casing, a fluid-tight gland around said spindle, and a lever connected with the outer end of said spindle and to which a weight may be attached to counterbalance the valve and its connections or to weight the same against a desired back pressure, substantially as described.

4. The combination with a valve-casing having an inlet and an outlet, and a valve provided with a spindle and arranged to control said inlet, of a sleeve secured on the valve-spindle, a curved lever mounted in said casing and connected with the valve-spindle through said sleeve at a point thereon adjacent to the valve, an arm mounted in the valve-casing and connected with the valve-spindle through said sleeve at a point near the end of the spindle, said lever and arm being arranged to permit movement of the valve and its spindle parallel with the axis of the casing-inlet, whereby the valve and its spindle are maintained at all times in axial line with the valve-casing inlet, and means for applying a weight or weights to said lever mechanism to counterbalance the valve or to adjust it against a desired back pressure, substantially as described.

5. The combination with a valve-casing, and a valve provided with a spindle, of lever mechanism connected with the valve-spindle and arranged to permit movement of the valve and its spindle parallel with the axis of the casing-inlet and whereby the valve and its spindle are maintained at all times in an axial position with relation to the valve-casing inlet, a spindle extended through the valve-casing and having a link connection with said valve-lever mechanism, and a dash-pot connected with said spindle, substantially as described.

In testimony whereof I have hereunto set my hand in presence of two subscribing witnesses.

ARTHUR W. CASH.

Witnesses:
HORACE C. GRICE,
JOHN E. SMITH.